United States Patent
Krishnan

(10) Patent No.: US 10,183,604 B2
(45) Date of Patent: Jan. 22, 2019

(54) CUP HOLDER ASSEMBLY WITH REMOVABLE CUP HOLDER INSERT

(71) Applicant: FORD GLOBAL TECHNOLOGIES, LLC, Dearborn, MI (US)

(72) Inventor: Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/077,359

(22) Filed: Mar. 22, 2016

(65) Prior Publication Data

US 2017/0274808 A1   Sep. 28, 2017

(51) Int. Cl.
*B60N 3/10*   (2006.01)
*A47G 23/02*  (2006.01)

(52) U.S. Cl.
CPC ......... *B60N 3/108* (2013.01); *A47G 23/0208* (2013.01); *B60N 3/10* (2013.01); *B60N 3/103* (2013.01)

(58) Field of Classification Search
None
See application file for complete search history.

(56) References Cited

U.S. PATENT DOCUMENTS

| 5,533,700 A | 7/1996 | Porter |
| 8,662,580 B2 | 3/2014 | Henke et al. |
| 2001/0030217 A1* | 10/2001 | Corrion ............ B29C 45/14754 |
| | | 224/501 |
| 2011/0297717 A1 | 12/2011 | Kaemmer |
| 2013/0264339 A1 | 10/2013 | Oldani et al. |

FOREIGN PATENT DOCUMENTS

| DE | 10217157 B4 | 12/2004 |
| DE | 202006001210 U1 | 3/2006 |
| EP | 1447267 A1 | 8/2004 |

OTHER PUBLICATIONS

English Machine Translation of DE10217157B4.
English Machine Translation of DE202006001210U1.
English Machine Translation of EP1447267A1.

* cited by examiner

*Primary Examiner* — Eric W Golightly
(74) *Attorney, Agent, or Firm* — Vichit Chea; King & Schickli, PLLC

(57) ABSTRACT

A cup holder assembly is provided. That cup holder assembly includes a body having a first cup well and a first resilient insert. The first resilient insert is seated within the first cup well for receiving and holding a cup. The first resilient insert may be easily removed from the cup well when cleaning a drink spill.

14 Claims, 4 Drawing Sheets

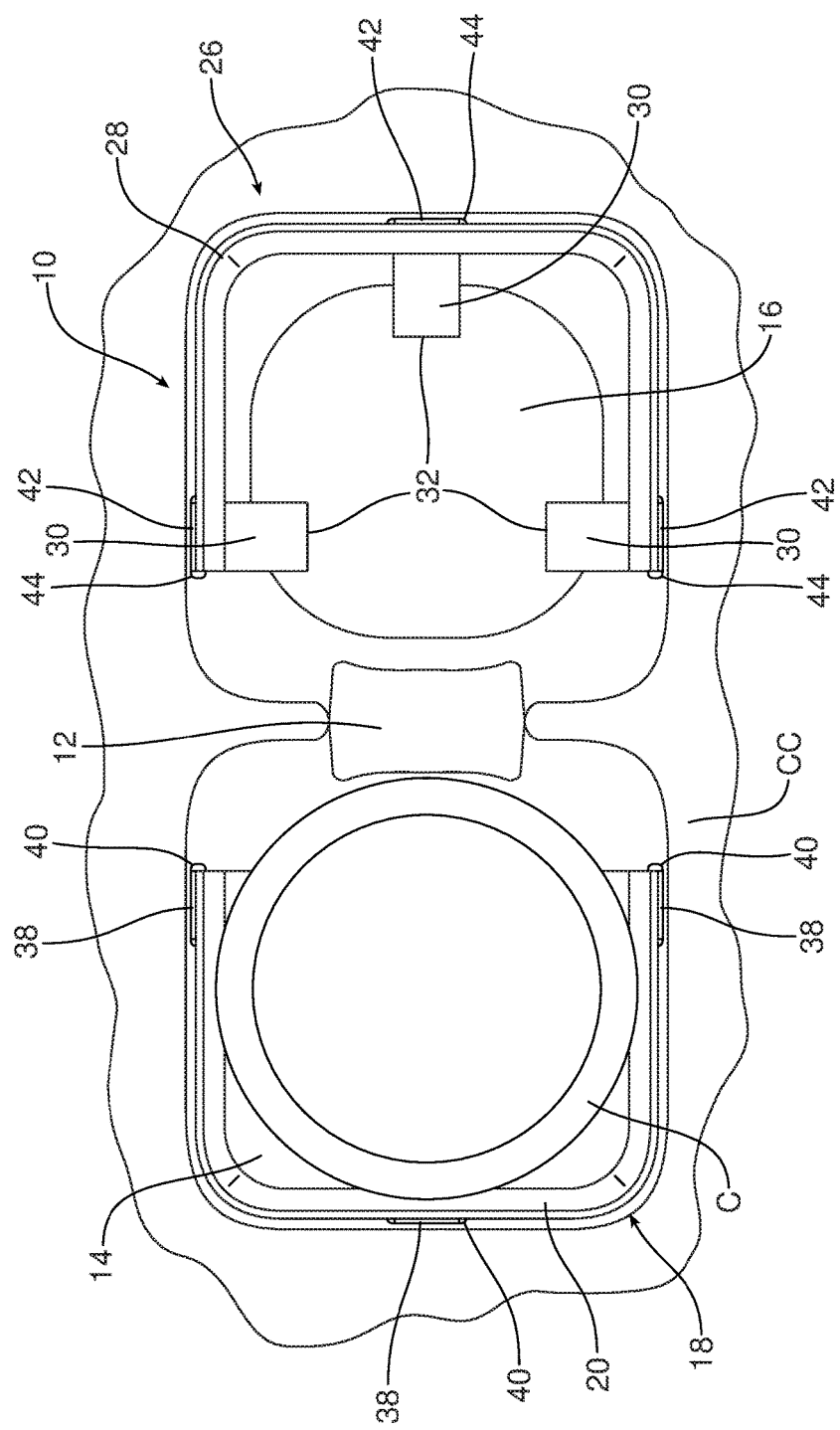

CUP HOLDER ASSEMBLY WITH REMOVABLE CUP HOLDER INSERT

TECHNICAL FIELD

This document relates generally to the motor vehicle equipment field and, more particularly, to a cup holder assembly that incorporates a resilient insert adapted to hold a cup. That resilient insert is removable from the cup well to allow for cleaning in the event of a drink spill.

BACKGROUND

Current motor vehicles commonly include multiple cup holders for securely holding drink cups in convenient locations where they may be easily reached by vehicle occupants. One or two cup holders are commonly provided in the center console between the driver and front passenger seats.

Typically such cup holders incorporate at least one cup well. In order to provide the ability to hold drink cups of different sizes, that well is typically equipped with mechanical fingers incorporating living hinges or a spring that will allow the mechanical fingers to yield and expand to receive a cup yet provide a gripping force to hold that cup once it is seated in the cup holder. Typically these mechanical fingers extend into the cup well through apertures provided in the wall of the cup well.

While cup holder assemblies of such design generally function well for their intended purpose, it is not uncommon for some of the drink to be spilled into the cup well. Many drinks such as fruit juices and soft drinks include significant amounts of sugar which is tacky and sticky on drying. As a result, the function of the mechanical fingers may be compromised by a drink spill to some degree. Since the mechanical fingers are mounted to the cup holder assembly behind the cup well the mechanical fingers cannot be removed for cleaning unless the entire cup holder assembly, including the body and cup well are removed from the center console. This is a difficult and even daunting task for many motor vehicle owners. As such, these owners may be forced to take their motor vehicles to a dealer to perform service on their cup holder assemblies.

This document relates to a new and improved cup holder assembly incorporating removable, resilient cup holder inserts that may be easily snapped out of a cup well to allow cleaning and then simply inserted and snapped back in place to restore the full function of the cup well in a simple and efficient manner. Thus, cup holder assembly cleaning may be easily performed by a motor vehicle owner.

SUMMARY

In accordance with the purposes and benefits described herein, a cup holder assembly is provided. That cup holder assembly comprises a body including a first cup well and a first removable and resilient insert. The first resilient insert is seated within the first cup well and functions to receive and hold a cup. The first cup well may have a first contour and the first resilient insert may have a second contour wherein the second contour nests in the first contour.

Further, the cup holder assembly may include a first mechanism for securing the first resilient insert in the first cup well. That first mechanism may include a first locking tab carried on the first resilient insert and a first, cooperating receiver in the first cup well that receives and holds the first locking tab when the first resilient insert is properly seated in the first cup well.

The first resilient insert may include an upper frame element. A plurality of legs may depend from the upper frame element. At least one of those legs may include a living hinge. Further, an end of each of the legs abuts a surface of the first cup well. Such a construction allows the first resilient insert to properly grasp and hold a wide range of cup sizes: typically, a wider range than possible with mechanical finger mechanisms that project through the side wall of the cup well as have been provided in the prior art.

Still further, in some embodiments, the body of the cup holder assembly further includes a second cup well. A second removable and resilient insert is seated within the second cup well. The second cup well may have a third contour and the second resilient insert may have a fourth contour wherein the fourth contour nests within the third contour.

Further, a second mechanism is provided for securing the second resilient insert in the second cup well. That second mechanism may include a second locking tab carried on the second resilient insert and a second cooperating receiver in the second cup well that receives and holds the second locking tab when the second resilient insert is properly seated within the second cup well.

The second resilient insert may include a second upper frame, and a second plurality of legs depending from the upper frame element. At least one of the legs of the second plurality of legs includes a living hinge. Further, an end of each leg of the second plurality of legs abuts a surface of the second cup well.

In accordance with yet another aspect, a method is provided of cleaning a drink spill in a cup well including a removable cup holder insert. That method comprises removing the removable cup holder insert from the cup well, cleaning the drink spill residue from the removable cup holder insert and the drink well and inserting the removable cup holder insert back into the drink well.

In the following description, there is shown and described a preferred embodiment of the cup holder assembly. As it should be realized, the cup holder assembly is capable of other, different embodiments and its several details are capable of modification in various, obvious aspects all without departing from the cup holder assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cup holder assembly and together with the description serve to explain certain principles thereof. In the drawing figures:

FIG. 3 is a top plane view of the assembled cup holder assembly in the center console of a motor vehicle with a cup held in the first cup well while the second cup well is empty.

Reference will now be made in detail to the present preferred embodiments of the cup holder assembly, examples of which are illustrated in the accompanying drawing figures.

DETAILED DESCRIPTION

Figure 1:
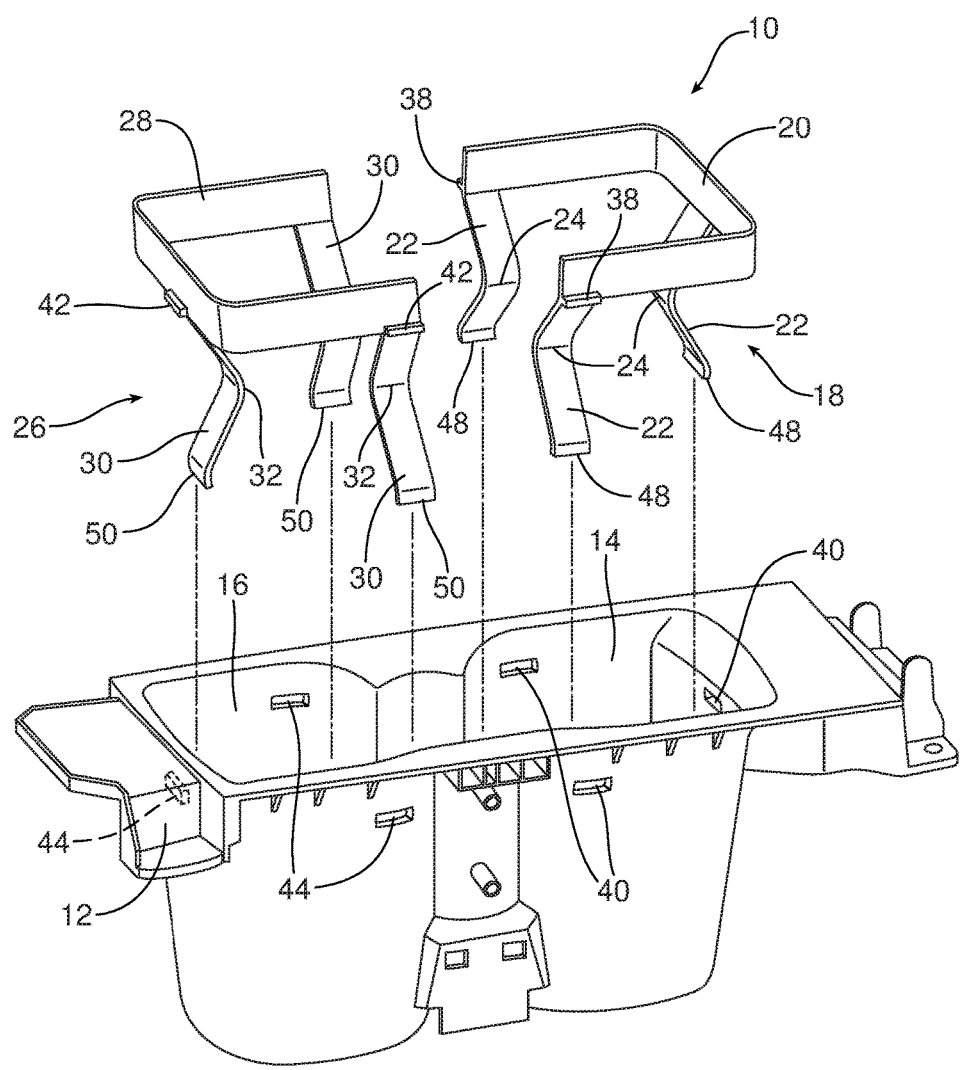
FIG. 1 is an exploded perspective view of the cup holder assembly including a body and first and second resilient inserts received in first and second cup wells formed in that body.

Reference is now made to FIG. 1 illustrating the cup holder assembly 10. The cup holder assembly 10 includes a body 12 having a first cup well 14 and a second cup well 16. A first resilient insert 18 is seated within the first cup well 14. The first resilient insert 18 includes an upper frame element 20 and a plurality of legs 22 depending from the upper frame element. In the illustrated embodiment each leg 22 includes a living hinge 24.

A second resilient insert 26 is seated in the second cup well 16. Similar to the first resilient insert 18, the second resilient insert 26 includes a second upper frame element 28. A second plurality of legs 30 depend from the second upper frame element 28. Each of the legs 30 includes a living hinge 32. It should be appreciated that the first resilient insert 18 and the second resilient insert 26 may be made from any appropriate material providing the necessary resiliency to freely receive and grip drinking cups, bottles and containers of various sizes.

Figure 2:
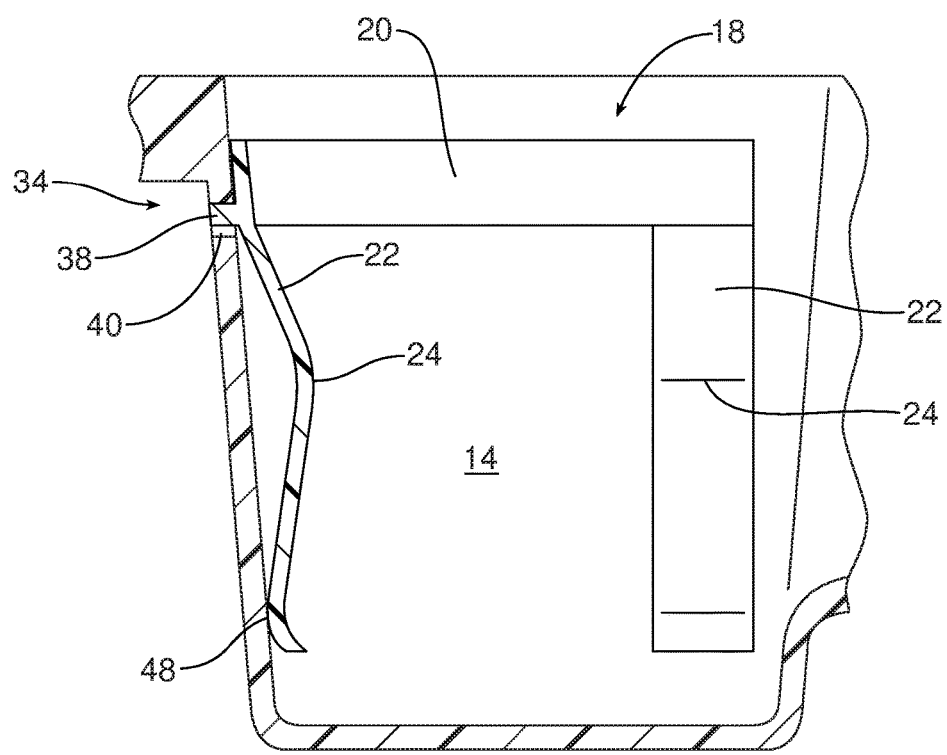
FIG. 2 is a detailed cross-sectional view illustrating the mechanism for securing the first resilient insert in the first cup well.

As should be appreciated from viewing FIGS. 1-3, the first cup well 14 has a first contour and the first resilient insert 18 has a second contour wherein the second contour nests in the first contour. Similarly, the second cup well 16 has a third contour while the second resilient insert 26 has a fourth contour wherein the fourth contour nests within the third contour. Thus, it should be appreciated that the first resilient insert is freely received within the first cup well 14 while the second resilient insert 26 is freely received within the second cup well 16.

A first mechanism, generally designated by reference numeral 34 secures the first resilient insert 18 in the first cup well 14 while a second mechanism, generally designated by reference numeral 36, secures the second resilient insert 26 in the second cup well 16.

In the illustrated embodiment, the first mechanism 34 comprises a first locking tab 38 projecting from the top of each leg 22 at the upper frame element 20 of the first resilient insert and cooperating receivers 40 in the first cup well 14. In the illustrated embodiment, the receivers 40 are apertures. Similarly, the second mechanism 36 includes a locking tab 42 at the top of each leg 30 at the upper frame element 28 of the second resilient insert 26 and cooperating receivers 44, again in the form of apertures, in the second cup well 16.

Figure 2A:
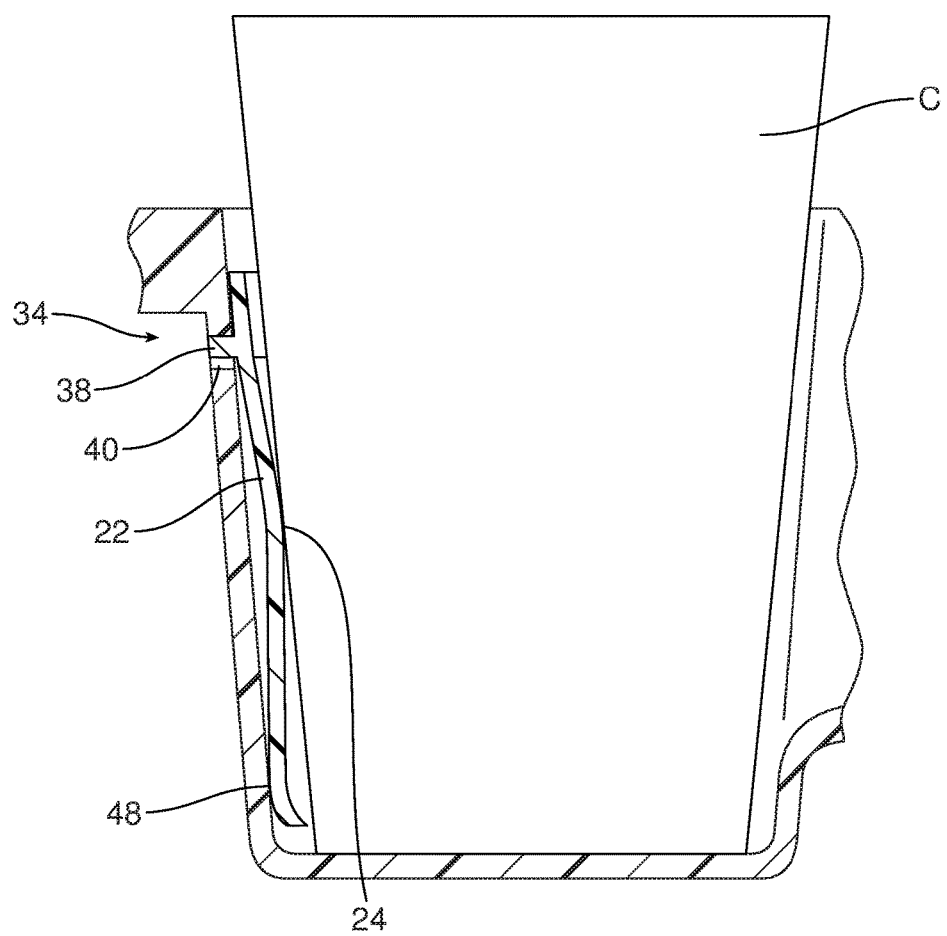
FIG. 2a is a view similar to FIG. 2 but illustrating the first resilient insert engaging and holding a cup.

Reference is now made to FIGS. 2 and 2a illustrating in cross-section how the first resilient insert 18 is received in the first cup well 14 with the locking tabs 38 received and held in the receivers 40. When a drinking cup, bottle or other container C is inserted into the first cup well 14, the legs 22 of the first resilient insert 18 yield and straighten until the cup C is seated against the bottom 46 of the well 14. In this position the living hinge 24 of the leg 22 pushes against the cup well 14 at the upper frame element 20 and at the bent end 48 of the leg 22 providing a gripping force against the wall of the cup C and the living hinge or flex point 32. The other legs, not shown, act in the same manner and provide a similar gripping force so that the cup is held securely between the three legs 22 of the first resilient insert 18. The legs 30 each include ends 50 that are shaped and function in a like manner.

When the cup C is withdrawn from the first cup well 14, it slides upwardly between the legs 18. The engagement of the locking tabs 38 in the receivers 40 and the geometry of the legs 22 of the first receiving insert 18 ensure that the first resilient insert 18 remains seated in the first cup well 14 during cup removal. The second resilient insert 26 in the second cup well 16 includes a locking mechanism 36 and a plurality of legs 30 that function in the same manner as the locking mechanism 34 and the legs 22 as shown in FIG. 2 and described above.

FIG. 3 is a top plan view of the cup holder assembly 10 mounted in the center console CC of a motor vehicle. A cup C is held in the first cup well 14 while the second cup well 16 is empty.

Consistent with the above description, a method is also provided for cleaning a drink spill in a cup well 14 of a cup holder assembly 10 including a removable cup holder insert 18. That method includes the step of removing the removable cup holder insert 18 from the cup well 14. This is done by snapping the locking tabs 38 of the first resilient insert 18 out of the receivers 40 and withdrawing the insert from the cup well 14.

This is followed by the cleaning of any drink spill residue from the cup holder insert 18 and the drink well 14. Here it should be appreciated that it is far easier to efficiently and effectively clean the insert 18 and the cup holder 14 in this disassembled condition. Accordingly, the sticky and tacky residue from a drink spill is easily eliminated.

Following cleaning, the removable cup holder insert 18 is inserted back into the drink well 14 and locked in position by means of the locking mechanism 34 including the locking tabs 38 and cooperating receivers 40.

The foregoing has been presented for purposes of illustration and description. It is not intended to be exhaustive or to limit the embodiments to the precise form disclosed. Obvious modifications and variations are possible in light of the above teachings. For example, while the first and second resilient inserts 18, 26 of the illustrated embodiment both include three depending legs 22, 30, a different number of legs may be provided if desired. Further the cup wells 14, 16 and resilient inserts 18, 26 may be different sizes if desired or even provided in numbers other than two. All such modifications and variations are within the scope of the appended claims when interpreted in accordance with the breadth to which they are fairly, legally and equitably entitled.

What is claimed:

1. A cup holder assembly, comprising:
    a body including a first cup well; and
    a first removable, resilient insert, seated within said first cup well, for receiving and holding a cup, wherein said first removable, resilient insert includes an upper frame element and a plurality of legs depending from said upper frame element wherein at least one leg of said plurality of legs includes a living hinge.

2. The cup holder assembly of claim 1, wherein said first cup well has a first contour and said first resilient insert has a second contour wherein said second contour nests in said first contour.

3. The cup holder assembly of claim 2, further including a first mechanism securing said first resilient insert in said first cup well.

4. The cup holder assembly of claim 3, wherein said first mechanism includes a first locking tab carried on said first resilient insert and a first cooperating receiver in said first cup well that receives and holds said first locking tab.

5. The cup holder assembly of claim 4, wherein an end of each leg of said plurality of legs abuts a surface of said first cup well.

6. The cup holder assembly of claim 4, wherein said body further includes a second cup well.

7. The cup holder assembly of claim 6, further including a second resilient insert, seated within said second cup well.

8. The cup holder assembly of claim 7, wherein said second cup well has a third contour and said second resilient insert has a fourth contour wherein said fourth contour nests within said third contour.

9. The cup holder assembly of claim 8, further including a second mechanism securing said second resilient insert in said second cup well.

10. The cup holder assembly of claim 9, wherein said second mechanism includes a second locking tab carried on said second resilient insert and a second cooperating receiver in said second cup well that receives and holds said second locking tab.

11. The cup holder assembly of claim 10, wherein said second resilient insert includes a second upper frame element.

12. The cup holder assembly of claim 11, wherein said second resilient insert includes a second plurality of legs depending from said upper frame element.

13. The cup holder assembly of claim 12, wherein at least one of leg of said second plurality of legs includes a living hinge.

14. The cup holder assembly of claim 13, wherein an end of each leg of said second plurality of legs abuts a surface of said second cup well.

\* \* \* \* \*